Oct. 29, 1940.   M. Y. SEATON   2,219,725
GRANULAR ADSORBENT AND MANUFACTURE THEREOF
Filed Oct. 6, 1936
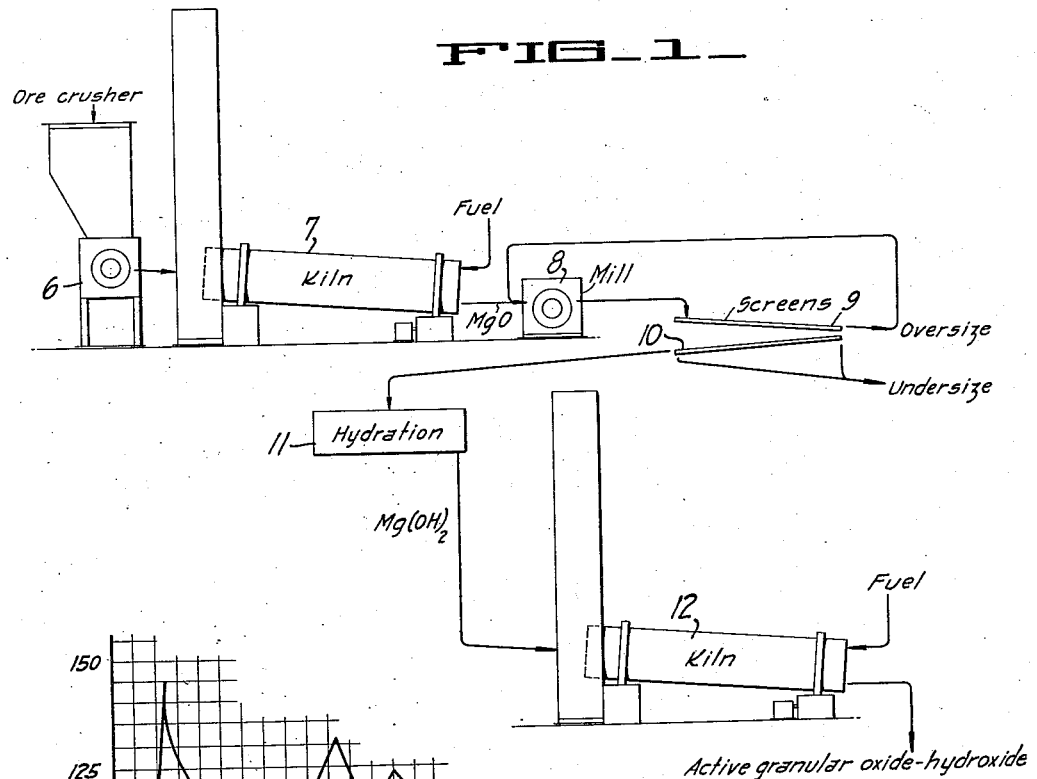
FIG_1_
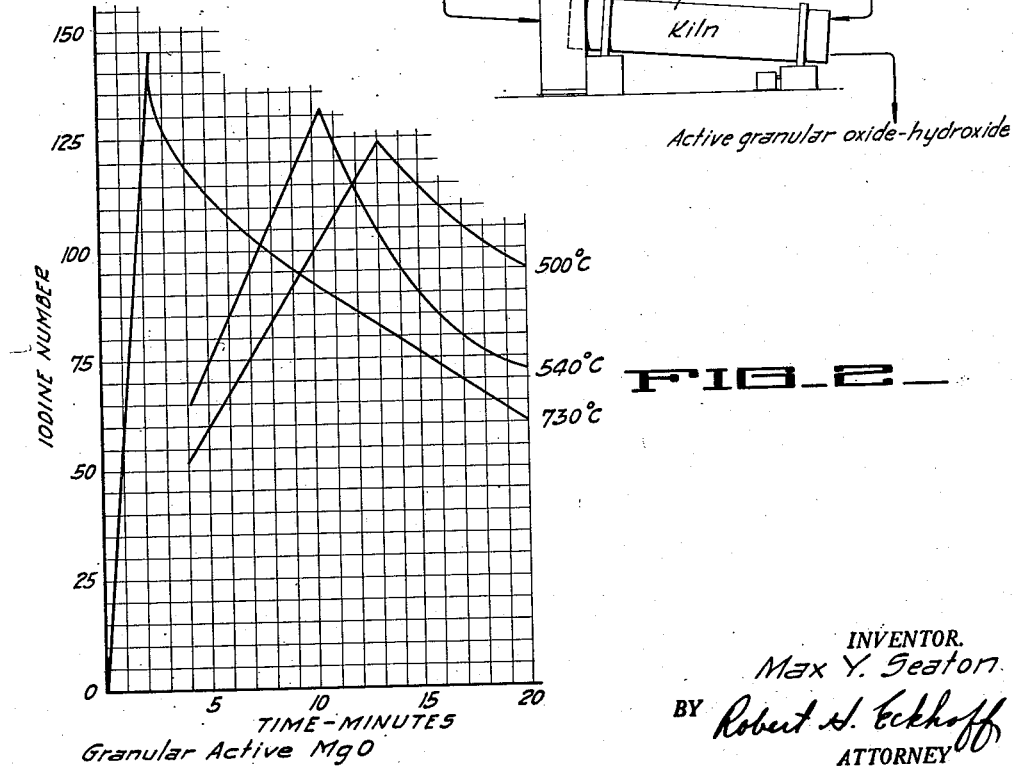
FIG_2_
INVENTOR.
Max Y. Seaton
BY Robert H. Eckhoff
ATTORNEY Patented Oct. 29, 1940

2,219,725

UNITED STATES PATENT OFFICE 2,219,725

GRANULAR ADSORBENT AND MANUFACTURE THEREOF

Max Y. Seaton, Greenwich, Conn., assignor to Westvaco Chlorine Products Corporation, New York, N. Y., a corporation of Delaware Application October 6, 1936, Serial No. 104,231

6 Claims. (Cl. 252—2)

This invention relates to production of a granular adsorbent magnesium compound and particularly to an adsorbent made from and containing appreciable quantities of Mg(OH)$_2$ and MgO.

Previous investigators have reported the production of active magnesium oxides and the utility of these in decolorizing mineral and vegetable oils. Thus, Hood and Salamon in their application for United States Patent No. 962,840 disclose that an oxide of a certain activity can be made by heating either magnesite or precipitated magnesium hydroxide to a dull red heat for a sufficient time to render the material substantially anhydrous. In their British Patent No. 16,617 of 1908, these same investigators indicate that the natural minerals, bauxite and magnesite, when calcined to oxides, are equivalent in activity to the oxides from chemically precipitated aluminum or magnesium hydroxide.

Based upon an extensive and detailed investigation I have found that while magnesium oxides, as disclosed by Hood and Salamon, are active, nevertheless their activity is of a low order. Further, their activity is so low as to render them commercially non-competitive with the other adsorbents now available. For example, the activity of the best magnesium oxide that can be made by direct calcination of the highest grade known magnesite in the world, a grade not available to Hood, falls far short of being of any interest commercially, while the activity of the best obtainable active aluminum oxide is even far less.

I have determined that while all previous investigators, including Hood, have recommended dehydration of the magnesium hydroxide so that it was substantially entirely MgO, this dehydration is undesirable, since it is not compatible with oxides of high activity. I have determined that a residual Mg(OH)$_2$ content of at least 2% is desirable and that about 10% Mg(OH)$_2$ is usually present in the material of greatest activity. While I have not as yet established the belief as a fact, I am now of the opinion that the material of this invention is a new composition represented broadly by the formula MgO.Mg(OH)$_2$. I have determined that at least 2% of Mg(OH)$_2$ should be present to ensure reasonably high activity and that the activity continues even if the Mg(OH)$_2$ content is as high as 75% and higher.

To be explicit, comparative values of adsorbents examined are given. The respective adsorbent powers are stated in terms of iodine number; that is the quantity of iodine adsorbent from a CCl$_4$ solution containing such an amount of iodine that removal of some by the adsorbent does not substantially affect further adsorption. More particularly, iodine number is, for convenience, one hundred times the number of milliequivalents of iodine removed per gram of active magnesium oxide from a solution of iodine of the aforementioned concentration. This test was chosen since it is independent of a variety of serious and valid objections that can be raised to color measurements on oils, other liquids, and substances. In terms of iodine number the following activities have been found as typical values:

| | Iodine number |
|---|---|
| Darco adsorbent char | 100 |
| Best active Al$_2$O$_3$ | 17 |
| Best oxide from magnesite by direct calcination | 55 |
| Activated magnesia mixture in granular form | 145 |

In accordance with the present invention, I have been able to produce on a commercial scale activated magnesias which are even more active than high-grade chars. In fact, I have prepared activated magnesias having iodine numbers of 145 and sometimes even higher. Furthermore, the activated materials of the present invention can be made in granular form, thus rendering the material more suitable for use in various processes in which liquids or gases are circulated or percolated over or through a pervious bed of adsorbent.

To produce the active granular magnesia material of this invention, I first prepare a substantially pure granular magnesium hydroxide in a manner set forth hereinbelow. This material is then baked under conditions producing a substantially but incompletely dehydrated material having a high adsorbent activity. Temperatures of the order of 500° C. or more give good results in a reasonably short time, and I have made excellent materials at much higher temperatures, for example 900° C., by using limited baking times. It will be clear from the equation and other considerations hereinbelow that baking temperatures substantially below 400° C., and requiring excessive times, such as an hour or more, are not well adapted for commercial practice. In order to avoid complete dehydration, and a resultant lowering of the adsorbent activity through excessive shrinkage, it is necessary to adhere to a time-temperature relation, which I have carefully determined by firing magnesium hydroxide in a muffle furnace.

The time-temperature relation, expressed mathematically for an activated magnesia made by calcination in a muffle furnace, is as follows:

Log time (minutes) = 3.7 − (0.00271 × °K.)
where K. is degrees Kelvin.

The above relation is a general one, and to apply it to any other equipment the constants are replaced by other values dependent on the particular equipment employed for the calcination. By following it I consistently produce activated magnesia having an activity of 100 and higher, preparations competitive with the best chars.

There is no commercial method of producing a coarse granular magnesium hydroxide by precipitation; all known precipitated magnesium hydrates are essentially finely divided in character. I find it desirable to produce the granular magnesium hydrate, for subsequent ignition, by subjecting a good grade of magnesite or brucite to calcination. Either before or after this initial calcining, the material is, where necessary, ground down to produce granules of the size desired. The granular magnesia thereby obtained is carefully hydrated, without destroying the granular form, to produce a granular magnesium hydrate which is then subjected to a second calcination in the manner set forth hereinabove to produce an activated and partially dehydrated product. Throughout the entire series of steps the desired granular form is retained, none of the operations being such as to destroy this granular form and thereby to result in a finely divided product.

In Figure 1, I have shown ore as fed into a crusher 6 wherein it is broken up, if necessary, into small lumps. The crushed ore then passes into kiln 7 wherein it is substantially entirely converted into MgO. The ore is then fed into a mill 8 where it is crushed to finely divided form, passing then to screen 9 which rejects all oversize material back to the mill 8. In practice screen 9 is usually 10 or 20 mesh. The sized material passes to screen 10 where the fines are eliminated. Screen 10 is usually 20, 28, 40 or finer, depending on the size of the product desired. I have successfully made products of such size that they will pass substantially 100% through a 10 or 20 mesh screen with substantially 100 per cent remaining on a 20, 28 or 40 screen in the case of the material passing the 10 mesh, and on a 28 or 40 in the case of the material passing the 20 mesh screen.

The calcined material is hydrated slowly so as to avoid disruption or bursting of the granules. Hydration is effected by adding a relatively pure water so that the resulting Mg(OH)$_2$ is not contaminated. Chlorides in the water are to be avoided for a 1 per cent NaCl content will cut the activity in half. If a relatively pure water is employed and if hydration is conducted at such a rate that the temperature does not rise above about 125° C. a granular Mg(OH)$_2$ satisfactory for heat conversion to active form will be available. The hydration step is indicated at 11. The hydrated material can then be heated to produce activated magnesia in kiln 12.

While I prefer to size the material after the calcination and before hydration, it can be done before the calcination or after hydration. The order is not vital except that in kiln 7 some breaking up of granules may occur which will raise the content of fines.

The actual activity found under various calcining times and temperatures is shown in Figure 2. It will be observed, upon due examination of said drawing, that by calcining magnesium hydroxide under carefully controlled conditions a very active material can be secured. It will also be observed that the most active materials were made at temperatures above a dull red heat and that the activity of these was at least double that of oxides directly made from calcined high grade magnesites which have a maximum value of only about 55. The invention is not limited to the specific times and temperatures shown in Fig. 2, and many other combinations of time and temperature give good results. For example, heating the hydrated magnesia to a temperature of approximately 660° C. for a few minutes to convert about 90 per cent of it to MgO gives good results.

It is to be pointed out that the exact time and temperature at which a partially hydrated material of maximum activity can be produced in kiln 12 cannot be predicted. This is not because the present invention is uncertain nor because it is based on mere manipulative features. Rather it is because rotary kilns and like equipment vary one from another to a considerable extent and because the actual nature of a kiln is such as to preclude exact measurements of different factors affecting the dehydration. For example, a definite single temperature is not maintained in a kiln. Instead, a temperature gradient exists through the kiln. It would be a rare coincidence if two kilns should have the same temperature gradient.

The inability to predict in advance exactly how to operate any kiln 12 on the hydrated Mg(OH)$_2$ is not a deterrent to practice of the invention. The essential factors and conditions in any kiln are easily determined now that I have indicated their nature. To produce a partially dehydrated magnesium hydroxide of maximum activity the kiln is started into operation and the stream of magnesium hydroxide to be partially dehydrated is fed into the kiln. The temperature at a given point in the kiln is determined and the iodine number of the calcined produce obtained at this temperature is determined. This temperature is not the temperature of the kiln as a whole, however, for what is maintained in the kiln is a temperature gradient rather than a single temperature. But after having once determined the temperature at a given point, the same gradient can be secured again, other things being constant, upon securing that temperature again at the given point. And when the temperature gradient is maintained substantially constant, similar starting materials yield products of similar iodine number and adsorbent activity. The adsorbent value is determined rather than residual Mg(OH)$_2$, since this value is the one in which the trade is interested. But when a material of high activity is produced, it will be found to have a residual Mg(OH)$_2$ content of at least 2 per cent.

The kiln 12 is operated under constant conditions except for the temperature. This is changed from time to time to secure samples of the magnesium material at different temperature gradients. Iodine numbers are run on each sample to determine, for the given kiln constants, at which gradient the material of maximum activity is produced. Kiln 12 is then returned to that temperature at which material of the maximum or other activity is secured. Such material often contains about 90 per cent MgO and the rest Mg(OH)$_2$.

Each kiln 12 will be found to have certain constants such as rotation rate and rate of through put of a given material. These cannot be varied to any substantial extent. The principal variable is the temperature gradient maintained in the kiln. By varying this I can vary the time-temperature relation to produce the maximum activity magnesium material of this invention; a preparation of high iodine number produced by calcination of freshly hydrated magnesia at that optimum temperature and for that optimum time which result in material having substantially the highest iodine number.

In the present case it is to be noted that the temperature-time relation is indicated in the drawing. The temperature can be relatively high or low so long as the relation is maintained and in any case but a few minutes heating is required. As a matter of fact, at the higher temperatures (800° C. and higher), the time is so low that the material is only virtually "flashed" to get the maximum activity material.

I do not wish to exclude activated magnesia preparations which are not of maximum activity for these are useful. For example, working on carotin it has been found that a material having an iodine number of from 50 to 70 is best. Such a material represents an Mg(OH)$_2$ content of nearly 80 per cent, and an MgO content of 20 per cent. The permissible Mg(OH)$_2$ content can thus range from 2% to nearly 100%. If an adsorbent of greater activity is used the carotin is destroyed.

The active materials I have disclosed are useful in various ways. I have successfully used them to recondition used cleaning solvents including Stoddard's fluid and CCl$_4$ base fluids, as well as to remove sulphur and mercaptans from petroleums wherein they were present in amounts of about 1 per cent. This material is also useful as a catalyst carrier in hydrogenation.

This application is a continuation-in-part of my prior copending applications Serial No. 81,654, filed May 25, 1936 and Serial No. 26,006, filed June 11, 1935, said application Serial No. 26,006 being in turn a continuation-in-part of my application Serial No. 703,935, filed December 26, 1933.

I claim:

1. The process of making a granular magnesian preparation having activated properties as an adsorbent, which comprises calcining a magnesium-containing mineral selected from the class consisting of magnesite and brucite in a coarsely divided condition to produce a granular magnesia, hydrating said magnesia without destroying the granular form, and then heating the granular magnesium hydrate thereby produced at a temperature of about 730° C. for about two and one-half minutes to effect a substantial but incomplete conversion thereof to magnesium oxide.

2. The process of making a granular magnesian preparation having activated properties as an adsorbent, which comprises calcining a magnesium-containing mineral selected from the class consisting of magnesite and brucite in coarsely divided condition to produce a granular magnesia, hydrating said magnesia without destroying the granular form, and then heating the granular magnesium hydrate thereby produced at a temperature of about 660° C. for a sufficient time to convert about 90 per cent thereof to magnesium oxide.

3. The process of making a granular magnesian preparation having activated properties as an adsorbent, which comprises calcining a magnesium-containing mineral selected from the class consisting of magnesite and brucite in a coarsely divided condition to produce a granular magnesia, hydrating said magnesia without destroying the granular form, and then heating the granular magnesium hydrate thereby produced at an elevated temperature of the order of 500° C. or more for a time sufficient to effect a substantial but incomplete conversion into magnesium oxide and to yield a magnesian product having an iodin adsorption value in excess of 55.

4. The process of making a granular magnesian preparation having activated properties as an adsorbent which comprises calcining magnesite in a coarsely divided condition to produce a granular magnesia, hydrating said magnesia without destroying the granular form, heating the granular magnesium hydrate thereby produced to a temperature of the order of 500° C. or more, maintaining such a temperature until only a substantial portion of the magnesium hydroxide is converted to magnesium oxide and until a minor but effective portion thereof remains unconverted for such length of time as to produce a product having an adsorbent activity, when compared to magnesium hydroxide obtained by calcination at a dull red heat of precipitated magnesium hydroxide which has been dehydrated until the magnesium hydroxide content thereof is 2 per cent, substantially in excess of said oxide.

5. The process of making a granular magnesian preparation having activated properties as an adsorbent, which comprises calcining a magensium-containing mineral selected from the class consisting of magnesite and brucite in a coarsely divided condition to produce a granular magnesium oxide, hydrating said magnesium oxide without destroying the said granular form, heating the granular magnesium hydrate to convert it largely to activated magnesium oxide in granular form, and controlling the said heating to effect conversion of the magnesium hydroxide to such an extent as to yield a product having a residual content of unconverted magnesium hydroxide in excess of 2 per cent.

6. As a new article of manufacture, the decomposition product resulting from the heating of granular magnesium hydroxide at a temperature above 400° C. for a limited time, the product having activated physical and chemical properties and consisting largely of magnesium oxide while having a residual magnesium hydroxide content lying above 2 per cent, and having a particle size too large to pass a forty-mesh screen.

MAX Y. SEATON.